(12) United States Patent
Li

(10) Patent No.: US 10,972,392 B2
(45) Date of Patent: Apr. 6, 2021

(54) PATH SWITCHING

(71) Applicant: New H3C Technologies Co., Ltd, Hangzhou (CN)

(72) Inventor: Jinglin Li, Beijing (CN)

(73) Assignee: NEW H3C TECHNOLOGIES CO., LTD, Hangzhou (CN)

(*) Notice: Subject to any disclaimer, the term of this patent is extended or adjusted under 35 U.S.C. 154(b) by 402 days.

(21) Appl. No.: 15/757,777

(22) PCT Filed: Sep. 23, 2016

(86) PCT No.: PCT/CN2016/099838
§ 371 (c)(1),
(2) Date: Mar. 6, 2018

(87) PCT Pub. No.: WO2017/050268
PCT Pub. Date: Mar. 30, 2017

(65) Prior Publication Data
US 2020/0177505 A1    Jun. 4, 2020

(30) Foreign Application Priority Data

Sep. 24, 2015  (CN) .......................... 201510615709.7

(51) Int. Cl.
*H04L 12/741*   (2013.01)
*H04L 12/707*   (2013.01)
*H04L 12/703*   (2013.01)

(52) U.S. Cl.
CPC ............ *H04L 45/745* (2013.01); *H04L 45/22* (2013.01); *H04L 45/28* (2013.01)

(58) Field of Classification Search
None
See application file for complete search history.

(56) References Cited

U.S. PATENT DOCUMENTS

| 2014/0269250 | A1 | 9/2014 | Bhikkaji et al. |
| 2015/0215156 | A1 | 7/2015 | Yoon |
| 2015/0372902 | A1* | 12/2015 | Giorgetti ............. H04L 41/0668 370/219 |

FOREIGN PATENT DOCUMENTS

| CN | 103782552 | 5/2014 |
| CN | 104270298 | 1/2015 |

(Continued)

OTHER PUBLICATIONS

International Search Report and Written Opinion issued in International Application No. PCT/CN2016/099838, dated Dec. 15, 2016.
(Continued)

*Primary Examiner* — Noel R Beharry
*Assistant Examiner* — Richard Schnell
(74) *Attorney, Agent, or Firm* — Norton Rose Fulbright US LLP

(57) ABSTRACT

A routing device receives a forwarding entry for forwarding a first flow and stores it locally. When the device is a key forwarding device of a first flow, the stored forwarding entry includes first and second forwarding entries. When the device is located in a primary forwarding path but is not the key forwarding device, the stored forwarding entry comprises one forwarding entry having a priority higher than a predefined minimum value. The device receives a first flow. When the stored forwarding entry comprises one forwarding entry having a priority higher than the minimum value and a link connected to an egress port in the forwarding entry has failed, the device sets the priority of the forwarding entry as the minimum value, and returns the first flow to the key forwarding device to trigger it to forward the first flow according to the second forwarding entry.

11 Claims, 5 Drawing Sheets

(56) References Cited

FOREIGN PATENT DOCUMENTS

| CN | 104303467 | 1/2015 |
| CN | 104348727 | 2/2015 |
| CN | 104639435 | 5/2015 |
| WO | WO 2014/131429 | 9/2014 |

OTHER PUBLICATIONS

European Search Report issued in corresponding European Patent Application No. 16848149.7, dated Oct. 12, 2018.
Office Action issued in Corresponding Chinese Patent Application No. 201510615709, dated Mar. 5, 2019 (English Translation).

* cited by examiner

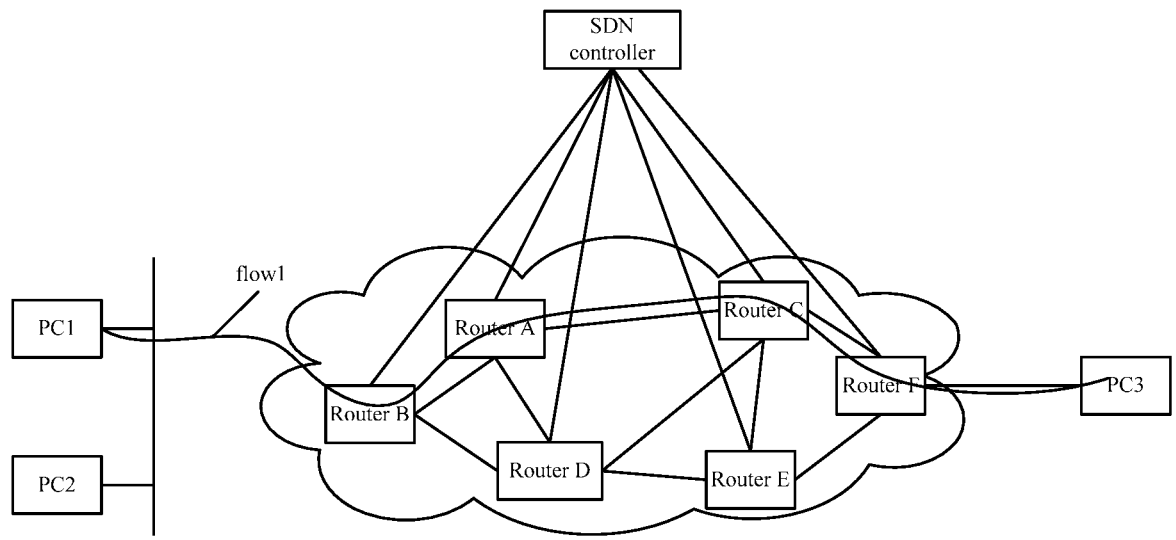

FIG. 1

201 the routing device receives a forwarding entry that is issued by an SDN controller and is used for forwarding a first flow and stores the forwarding entry locally. When the routing device is determined as a key forwarding device of the first flow by the SDN controller, the locally stored forwarding entry for forwarding the first flow includes a first forwarding entry and a second forwarding entry. The priority of the first forwarding entry is higher than that of the second forwarding entry and the priorities of the first forwarding entry and the second forwarding entry are larger than a predefined minimum value. The first forwarding entry is generated by the SDN controller according to a primary forwarding path determined for the first flow, and the second forwarding entry is generated by the SDN controller according to a secondary forwarding path determined for the first flow. When the routing device is located in the primary forwarding path but is not determined as the key forwarding device of the first flow by the SDN controller, the locally stored forwarding entry for forwarding the first flow includes one forwarding entry having a priority higher than the predefined minimum value

202 the routing device receives the first flow, when determining that the locally stored forwarding entry for forwarding the first flow includes one forwarding entry having a priority higher than the predefined minimum value and detecting that a link connected to an egress port in the locally stored forwarding entry is failed, sets the priority of the locally stored forwarding entry as the predefined minimum value, and returns the first flow to the key forwarding device to trigger the key forwarding device to forward the first flow according to the second forwarding entry

FIG. 2

PATH SWITCHING

This application is a national phase under 35 U.S.C. § 371 of International Application No. PCT/CN2016/099838, filed Sep. 23, 2016, which claims the benefit of priority to Chinese Patent Application No. 201510615709.7, filed Sep. 24, 2015. The contents of each of the above-referenced applications are incorporated into the present application by reference.

BACKGROUND

A Software Defined Network (SDN) is an implementation mode of network virtualization. The core technology of the SDN is OpenFlow, which may implement the flexible management of network flows by separating the control plane of a network device from the data plane of the network device, thereby making the SDN more intelligent as a pipeline.

BRIEF DESCRIPTION OF THE DRAWINGS

FIG. 1 is a diagram illustrating the structure of an SDN according to some examples of the present disclosure.

FIG. 2 is a flowchart illustrating a path switching method according to some examples of the present disclosure.

DETAILED DESCRIPTION

Figure 3:
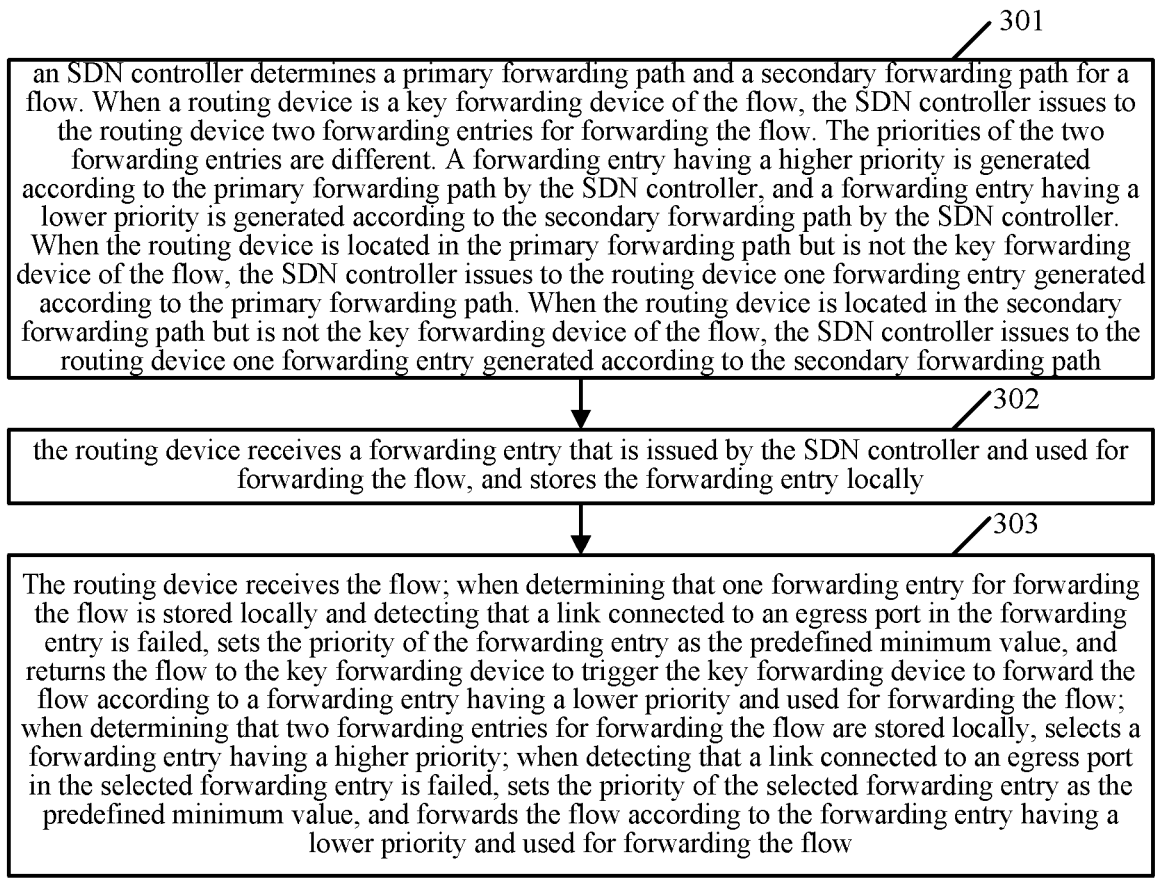
FIG. 3 is a flowchart illustrating another path switching method according to some examples of the present disclosure.

The examples of the present disclosure will be illustrated with reference to the accompanying drawings.

FIG. 1 is a diagram illustrating the structure of an SDN according to some examples of the present disclosure. As shown in FIG. 1, Routers A-F are located in an SDN, and an SDN controller manages each router in the SDN. Taking Router B in the SDN for an example, when receiving the first packet of a flow (called flow1) sent from PC1 to PC3, Router B sends the first packet to the SDN controller. The SDN controller generates a forwarding path after path calculation, supposed that the forwarding path is Router B→Router A→Router C→Router F. The SDN controller generates an OpenFlow entry for each router in the forwarding path according to the forwarding path and issues the OpenFlow entry to each router, so as to indicate routers in the forwarding path to forward a packet of flow1 from PC1 to PC3. Suppose the OpenFlow entries issued to Router B, Router A, Router C and Router F by the SDN controller are called OpenFlow entry B, OpenFlow entry A, OpenFlow entry C and OpenFlow entry F respectively. Afterwards, Router B forwards the packet to Router A according to the OpenFlow entry B matching with the packet. After receiving the packet, Router A forwards the packet to Router C according to the OpenFlow entry A matching with the packet. After receiving the packet, Router C forwards the packet to Router F according to the OpenFlow entry C matching with the packet. After receiving the packet, Router F forwards the packet to PC3 according to the OpenFlow entry F matching with the packet.

During the above packet forwarding process, if a link between Router C and Router F is failed, the packet is unable to be forwarded to Router F even if Router C has the OpenFlow entry C matching with the packet, thereby resulting in packet sending disconnection. The duration of packet sending disconnection relates to periods T1 to T4, i.e., a period T1 during which Router C and Router F report the failure of the link to the SDN controller, a period T2 during which the SDN controller recalculates a path, a period T3 during which the SDN controller generates a new OpenFlow entry according to the recalculated path and a period T4 during which the SDN controller issues the new OpenFlow entry.

FIG. 2 is a flowchart illustrating a path switching method according to some examples of the present disclosure. The method may be applicable to a routing device in an SDN. As shown in FIG. 2, the method includes following blocks.

At block 201, the routing device receives a forwarding entry that is issued by an SDN controller and is used for forwarding a first flow and stores the forwarding entry locally. When the routing device is determined as a key forwarding device of the first flow by the SDN controller, the locally stored forwarding entry for forwarding the first flow includes a first forwarding entry and a second forwarding entry. The priority of the first forwarding entry is higher than that of the second forwarding entry and the priorities of the first forwarding entry and the second forwarding entry are larger than a predefined minimum value. The first forwarding entry is generated by the SDN controller according to a primary forwarding path determined for the first flow, and the second forwarding entry is generated by the SDN controller according to a secondary forwarding path determined for the first flow. When the routing device is located in the primary forwarding path but is not determined as the key forwarding device of the first flow by the SDN controller, the locally stored forwarding entry for forwarding the first flow includes one forwarding entry having a priority higher than the predefined minimum value.

At block 202, the routing device receives the first flow; when determining that the locally stored forwarding entry for forwarding the first flow includes one forwarding entry having a priority higher than the predefined minimum value and detecting that a link connected to an egress port in the locally stored forwarding entry is failed, sets the priority of the locally stored forwarding entry as the predefined minimum value; and returns the first flow to the key forwarding device to trigger the key forwarding device to forward the first flow according to the second forwarding entry.

In some examples of the present disclosure, the process of returning the first flow to the key forwarding device includes:

determining, in the locally stored forwarding entry for forwarding the first flow, an ingress port via which the first flow enters the routing device;

encapsulating the first flow with a special flow identity, wherein the special flow identity is used for matching with a special flow entry, and the special flow entry is used for returning the first flow to the key forwarding device; and forwarding the first flow with the special flow identity via the ingress port.

In some examples of the present disclosure, the method further includes:

receiving a second flow with a special flow identity, and matching the special flow identity of the second flow with a local special forwarding entry;

performing, according to the local special forwarding entry, a process of: removing the special flow identity of the second flow, searching for a locally stored forwarding entry having the highest priority and used for forwarding the second flow, setting the priority of the found forwarding entry having the highest priority and used for forwarding the second flow as the predefined minimum value, checking whether there is a locally stored forwarding entry having a priority higher than the predefined minimum value and used for forwarding the second flow; if there is the locally stored forwarding entry having a priority higher than the predefined minimum value and used for forwarding the second flow, forwarding the second flow according to the forwarding entry having a priority higher than the predefined minimum value and used for forwarding the second flow; if there is no locally stored forwarding entry having a priority higher than the predefined minimum value and used for forwarding the second flow, determining, in the found forwarding entry having the highest priority and used for forwarding the second flow, an ingress port via which the second flow enters the routing device, encapsulating the second flow with a special flow identity, and forwarding the second flow with the special flow identity via the ingress port.

In some examples of the present disclosure, after receiving the first flow, the method further includes:

when determining that the locally stored forwarding entry for forwarding the first flow includes the first forwarding entry and the second forwarding entry, selecting the first forwarding entry with a priority higher than the priority of the second forwarding entry; when detecting that a link connected to an egress port in the first forwarding entry is failed, setting the priority of the first forwarding entry as the predefined minimum value, and forwarding the first flow according to the second forwarding entry.

In some examples of the present disclosure, the method further includes:

when the routing device is located in a secondary forwarding path for forwarding a third flow but is not determined as a key forwarding device of the third flow by the SDN controller, receiving a forwarding entry that is issued by the SDN controller and is used for forwarding the third flow, and storing the forwarding entry for forwarding the third flow locally, wherein the locally stored forwarding entry for forwarding the third flow includes one forwarding entry having a priority higher than the predefined minimum value, and the forwarding entry having a priority higher than the predefined minimum value is generated by the SDN controller according to the secondary forwarding path for forwarding the third flow;

receiving the third flow forwarded by the key forwarding device, wherein the third flow is forwarded by the key forwarding device according to one of two locally stored forwarding entries for forwarding the third flow after removing a special flow identity of the third flow, wherein the priority of the one of two locally stored forwarding entries is lower than the priority of the other one of two locally stored forwarding entries; and when determining that the locally stored forwarding entry for forwarding the third flow includes one forwarding entry having a priority higher than the predefined minimum value, forwarding the third flow according to the forwarding entry having the priority higher than the predefined minimum value.

FIG. 3 is a flowchart illustrating another path switching method according to some examples of the present disclosure. The path switching method may be applicable in an SDN. As shown in FIG. 3, the method includes following blocks.

At block 301, an SDN controller determines a primary forwarding path and a secondary forwarding path for a flow. When a routing device is a key forwarding device of the flow, the SDN controller issues to the routing device two forwarding entries for forwarding the flow. The priorities of the two forwarding entries are different. A forwarding entry having a higher priority is generated according to the primary forwarding path by the SDN controller, and a forwarding entry having a lower priority is generated according to the secondary forwarding path by the SDN controller. When the routing device is located in the primary forwarding path but is not the key forwarding device of the flow, the SDN controller issues to the routing device one forwarding entry generated according to the primary forwarding path. When the routing device is located in the secondary forwarding path but is not the key forwarding device of the flow, the SDN controller issues to the routing device one forwarding entry generated according to the secondary forwarding path.

In some examples of the present disclosure, when the routing device is located at a branching point of the primary forwarding path and the secondary forwarding path that are determined for the flow, the routing device is determined as the key forwarding device.

In the description of block 301, the priorities of two forwarding entries that are issued to the routing device when the routing device is the key forwarding device of the flow are higher than the predefined minimum value, and the priority of one forwarding entry that is issued to the routing device when the routing device is not the key forwarding device of the flow but is located in the primary forwarding path or the secondary forwarding path is also higher than the predefined minimum value. The predefined minimum value may be set according to an actual application, for example, set as 0.

At block 302, the routing device receives a forwarding entry that is issued by the SDN controller and used for forwarding the flow, and stores the forwarding entry locally.

At block 303, the routing device receives the flow; when determining that one forwarding entry for forwarding the flow is stored locally and detecting that a link connected to an egress port in the forwarding entry is failed, sets the priority of the forwarding entry as the predefined minimum value, and returns the flow to the key forwarding device to trigger the key forwarding device to forward the flow according to a forwarding entry having a lower priority and used for forwarding the flow; when determining that two forwarding entries for forwarding the flow are stored locally, selects a forwarding entry having a higher priority; when detecting that a link connected to an egress port in the selected forwarding entry is failed, sets the priority of the selected forwarding entry as the predefined minimum value, and forwards the flow according to the forwarding entry having a lower priority and used for forwarding the flow.

Figure 4:
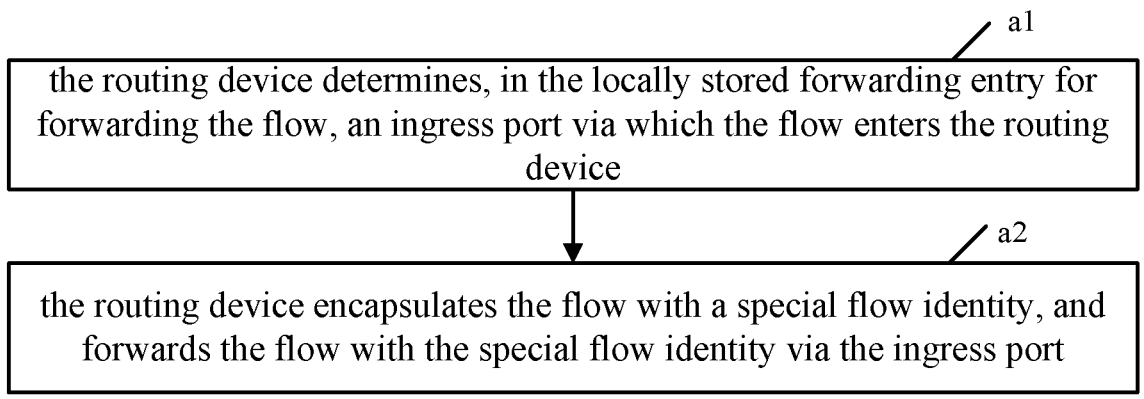
FIG. 4 is a flowchart illustrating a method for returning a flow to a key forwarding device by a routing device according to some examples of the present disclosure.

At block 303, the process of returning the flow to the key forwarding device to trigger the key forwarding device to forward the flow according to the forwarding entry having the lower priority and used for forwarding the flow includes blocks shown in FIG. 4. FIG. 4 is a flowchart illustrating a method for returning a flow to a key forwarding device by a routing device according to some examples of the present disclosure. Referring to FIG. 4, the method includes blocks a1 and a2.

At block a1, the routing device determines, in the locally stored forwarding entry for forwarding the flow, an ingress port via which the flow enters the routing device.

Usually, the forwarding entry issued to the routing device by the SDN controller includes an ingress port. Accordingly, at block a1, the routing device determines the ingress port in the locally stored forwarding entry for forwarding the flow as the ingress port via which the flow enters the routing device.

At block a2, the routing device encapsulates the flow with a special flow identity, and forwards the flow with the special flow identity via the ingress port.

The special flow identity is used for matching with a special flow entry. The special flow entry is issued by the SDN controller to the routing device in the primary forwarding path of the flow and is used for returning the flow to the key forwarding device. Because the flow corresponding to the flow identity of the special flow entry is inexistent actually, for example, indicated with only 1 or only 0, the flow identity of the special flow entry is called the special flow identity. The special flow entry will not match with a normal flow, and only matches with the special flow identity.

When the routing device forwards the flow with the special flow identity according to the description of block a2, a middle routing device between the routing device and the key forwarding device receives the flow with the special flow identity. When receiving the flow with the special flow identity, the middle routing device matches the special flow identity of the flow with a local special forwarding entry, and performs, according to the local special forwarding entry, a process of: removing the special flow identity of the flow, and setting the priority of a locally stored forwarding entry for forwarding the flow as the predefined minimum value; when determining that there is no locally stored forwarding entry having a priority higher than the predefined minimum value and used for forwarding the flow, determining, in the locally stored forwarding entry for forwarding the flow, an ingress port via which the flow enters the middle routing device, encapsulating the flow with the special flow identity, and forwarding the flow with the special flow identity via the ingress port until the flow with the special flow identity is forwarded to the key forwarding device.

When receiving the flow with the special flow identity, the key forwarding device matches the special flow identity of the flow with a local special forwarding entry, and performs, according to the local special forwarding entry, a process of: removing the special flow identity of the flow, selecting a locally stored forwarding entry having the highest priority and used for forwarding the flow, setting the priority of the selected forwarding entry as the predefined minimum value, and checking whether there is a locally stored forwarding entry having a priority higher than the predefined minimum value and used for forwarding the flow; if there is the forwarding entry having a priority higher than the predefined minimum value and used for forwarding the flow, forwarding the flow via an ingress port in the forwarding entry having a priority higher than the predefined minimum value and used for forwarding the flow. According to the above description for two forwarding entries having different priorities and used for forwarding the flow, which are stored locally by the key forwarding device, if the key forwarding device forwards the flow according to the forwarding entry having a priority higher than the predefined minimum value and used for forwarding the flow, it is equivalent to switching the flow to the secondary forwarding path, thereby implementing the flow switching from the primary forwarding path to the secondary forwarding path.

The routing device in block 303 may also perform similar processing to that performed by the above middle routing device or the key forwarding device.

Block 303 is performed to implement the flow switching from the primary forwarding path to the secondary forwarding path. Accordingly, in order to implement the flow switching from the primary forwarding path to the secondary forwarding path, the routing device at block 303 may be determined as the key forwarding device of the flow, or may be determined as a routing device that is located in the primary forwarding path but is not the key forwarding device. If the routing device is located in the secondary forwarding path but is not the key forwarding device, the routing device forwards the flow according to a locally stored forwarding entry for forwarding the flow when receiving the flow.

The flowchart shown in FIG. 3 will be described according to an embodiment.

Figure 5:
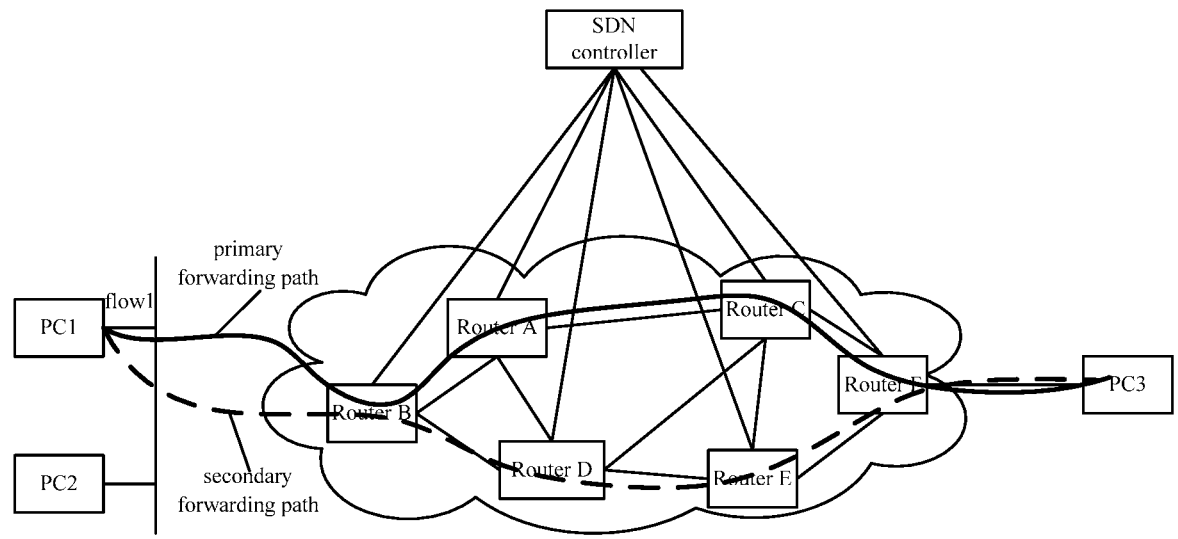
FIG. 5 is a diagram illustrating the structure of another SDN according to some examples of the present disclosure.

An SDN shown in FIG. 5 is taken as an example. As shown in FIG. 5, if a flow (called flow1) is to be sent from PC1 to PC3, an SDN controller generates two forwarding paths for the flow1 after path calculation. One of the two forwarding paths is a primary forwarding path and is indicated by a real line. The primary forwarding path is Router B→Router A→Router C→Router F. The other one of the two forwarding paths is a secondary forwarding path and is indicated by a dotted line. The secondary forwarding path is Router B→Router D→Router E→Router F.

Router B is located at a branching point of the primary forwarding path and the secondary forwarding path, and is a key forwarding device of the flow1. The SDN controller issues to Router B two forwarding entries for forwarding the flow1. The priorities of the two forwarding entries are different but are both larger than a predefined minimum value. A forwarding entry having a higher priority is called entry B1, which is generated according to the primary forwarding path and is used for forwarding the flow1 by Router B. A forwarding entry having a lower priority is called entry B2, which is generated according to the secondary forwarding path and is used for forwarding the flow1 by Router B.

Router A is located in the primary forwarding path but is not the key forwarding device of the flow1. The SDN controller issues to Router A one forwarding entry for forwarding the flow1. The forwarding entry is called entry A1, which is generated according to the primary forwarding path and is used for forwarding the flow1 by Router A. The priority of the entry A1 is larger than the predefined minimum value, but the value of the priority of the entry A1 is unrelated to the priority of a forwarding entry on each other routing device, and may be a predefined first default value.

Router C is located in the primary forwarding path but is not the key forwarding device of the flow1. The SDN controller issues to Router C one forwarding entry for forwarding the flow1. The forwarding entry is called entry C1, which is generated according to the primary forwarding path and is used for forwarding the flow1 by Router C. The priority of the entry C1 is larger than the predefined minimum value, but the value of the priority of the entry C1 is unrelated to the priority of a forwarding entry on each other routing device, and may be a predefined first default value.

Router D is located in the secondary forwarding path but is not the key forwarding device of the flow1. The SDN controller issues to Router D one forwarding entry for forwarding the flow1. The forwarding entry is called entry 131, which is generated according to the secondary forwarding path and is used for forwarding the flow1 by Router D. The priority of the entry DI is larger than the predefined minimum value, but the value of the priority of the entry DI is unrelated to the priority of a forwarding entry on each other routing device, and may be a predefined second default value.

Router E is located in the secondary forwarding path, but is not the key forwarding device of the flow1. The SDN controller issues to Router E one forwarding entry for forwarding the flow1. The forwarding entry is called entry E1, which is generated according to the secondary forwarding path and is used for forwarding the flow1 by Router E. The priority of the entry E1 is larger than the predefined minimum value, but the value of the priority of the entry E1 is unrelated to the priority of a forwarding entry on each other routing device, and may be a predefined second default value.

Router F is located in both the primary forwarding path and the secondary forwarding path, and is located at a converging point of the primary forwarding path and the secondary forwarding path rather than located at the branching point of the primary forwarding path and the secondary forwarding path. The SDN controller may issue one forwarding entry to Router F according to actual applications. The issued forwarding entry may be generated by the SDN controller according to the primary forwarding path and is used for forwarding the flow1 by Router F, or may be generated by the SDN controller according to the secondary forwarding path and is used for forwarding the flow1 by Router F. Regardless of the forwarding entry generated according to the primary forwarding path or the forwarding entry generated according to the secondary forwarding path, the forwarding entry issued by the SDN controller is always called entry F1. The priority of the entry F1 is larger than the predefined minimum value, but the value of the priority of the entry F1 is unrelated to the priority of a forwarding entry on each other routing device, and may be a predefined value, for example, a predefined first default value or a predefined second default value.

As shown in FIG. 5, the flow1 sent by PC1 will reach Router B first. When receiving the flow1, Router B finds that two forwarding entries for forwarding the flow1 are stored locally, and selects the entry B1 having a higher priority. If Router B detects that a link connected to an egress port in the entry B1 is normal, Router B sends the flow1 via the egress port in the entry B1. The flow1 is sent from Router B to Router A.

After receiving the flow1, Router A finds that one forwarding entry for forwarding the flow1 is stored locally, i.e., the entry A1. If Router A detects that a link connected to an egress port in the entry A1 is normal, Router A sends the flow1 via the egress port in the entry A1. The flow1 is sent from Router A to Router C.

Figure 6:
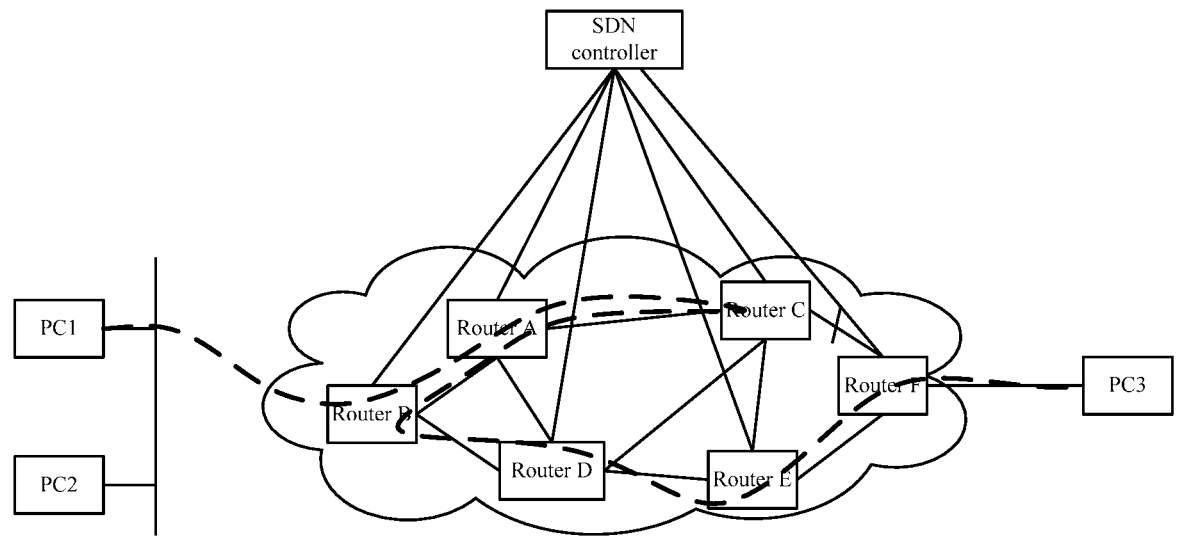
FIG. 6 is a diagram illustrating a forwarding path of a flow in an SDN according to some examples of the present disclosure.

After receiving the flow1, Router C finds that one forwarding entry for forwarding the flow1 is stored locally, i.e., the entry C1. If Router C detects that a link connected to an egress port in the entry C1 is failed, i.e., the link cannot be used for forwarding the flow1, the Router C reports the failure of the link to the SDN controller. The failure of the link connected to the egress port in the entry C1 is the failure of the link between Router C and Router F, as shown in FIG. 6. The failure of the link may be detected through Bidirectional Forwarding Detection (BFD). The failure of the link may include that the link is down, the sending of the flow1 is failed, and so on.

Router C sets the priority of the entry C1 as the predefined minimum value. In this example, the predefined minimum value is 0. If Router C determines that there is no locally stored forwarding entry having a priority higher than 0 and used for forwarding the flow1, Router C encapsulates the flow1 with a special flow identity. In this example, the special flow identity is denoted as flow XXX. The Router C sends the flow1 with the flow XXX via the ingress port in the entry C1. The flow1 with the flow XXX is returned to Router A.

Router A receives the flow1 with the flow XXX, matches the flow XXX with a local special forwarding entry, and removes the flow XXX of the flow1 according to the matched special forwarding entry, i.e., restores the original flow1. Router A determines a locally stored forwarding entry having the highest priority and used for forwarding the flow1, i.e., the entry A1, sets the priority of the entry A1 as 0, and checks whether there is a locally stored forwarding entry having a priority higher than 0 and used for forwarding the flow1. If there is no locally stored forwarding entry having a priority higher than 0 and used for forwarding the flow1, Router A encapsulates the flow1 with the flow XXX, and sends the flow1 with the flow XXX via the ingress port in the entry A1. The flow1 with the flow XXX is returned to Router B.

Router B receives the flow1 with the flow XXX, matches the flow XXX with a local special forwarding entry, and removes the flow XXX of the flow1 according to the matched special forwarding entry, i.e., restores the original flow1. Router B determines a locally stored forwarding entry having the highest priority and used for forwarding the flow1, i.e., the entry B1, sets the priority of the entry B1 as 0, and checks whether there is a locally stored forwarding entry having a priority higher than 0 and used for forwarding the flow1. As a result, Router B finds that the entry B2 has a priority higher than 0 and is used for forwarding the flow1, and thus forwards the flow1 via an egress port in the entry B2. When receiving the flow1, Router D sends the flow1 via an egress port in a locally stored forwarding entry for forwarding the flow1, i.e., the entry DI. Router E and Router F perform similar processing to that performed by Router D, and finally the flow1 sent from PC1 is forwarded to PC3 via the secondary forwarding path, Router B→Router D→Router E→Router F, rather than via the failed link between Router C and Router F. Based on the SDN shown in FIG. 5, FIG. 6 shows a temporary forwarding path of flow1 with a dotted line.

When a subsequent flow1 sent from PC1 reaches Router B, because Router B has set the priority of the entry B1 as the predefined minimum value 0, Router B matches the subsequent flow1 with the entry B2 generated for the secondary forwarding path, and finally the subsequent flow1 is forwarded to PC3 via the secondary forwarding path, Router B→Router D→Router E→Router F. In this case, before the SDN controller updates the forwarding entry of each routing device for the failure of the link, the disconnection of the flow may be avoided. After the SDN controller updates the forwarding entry of each routing device for the failure of the link, each routing device forwards the flow according to the updated forwarding entry.

A path switching apparatus will be described hereinafter according to some examples of the present disclosure. The path switching apparatus may be applicable in an SDN.

Figure 7:
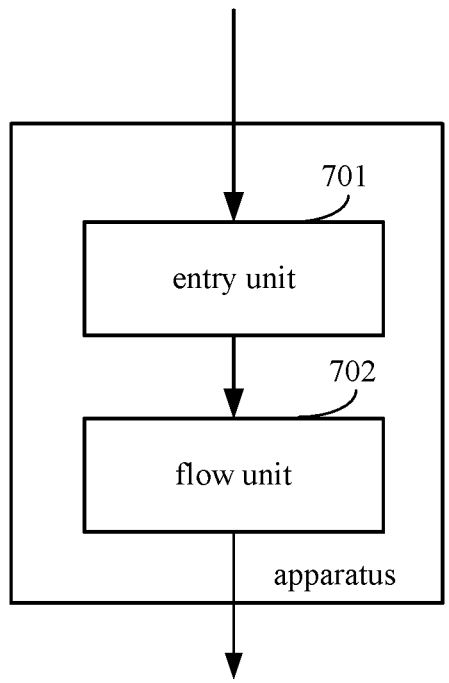
FIG. 7 is a diagram illustrating the structure of a path switching apparatus according to some examples of the present disclosure.

FIG. 7 is a diagram illustrating the structure of a path switching apparatus according to some examples of the present disclosure. The apparatus may be applicable to a routing device in an SDN. As shown in FIG. 7, the apparatus may include an entry unit 701 and a flow unit 702.

The entry unit 701 may receive a forwarding entry that is issued by an SDN controller and is used for forwarding a first flow, and store the forwarding entry locally. When the routing device is determined as a key forwarding device of the first flow by the SDN controller, the locally stored forwarding entry for forwarding the first flow includes a first forwarding entry and a second forwarding entry. The priority of the first forwarding entry is higher than that of the second forwarding entry and the priorities of the first forwarding entry and the second forwarding entry are larger than a predefined minimum value. The first forwarding entry is generated by the SDN controller according to a primary forwarding path determined for the first flow, and the second forwarding entry is generated by the SDN controller according to a secondary forwarding path determined for the first flow. When the routing device is located in the primary forwarding path but is not determined as the key forwarding device of the first flow by the SDN controller, the locally stored forwarding entry for forwarding the first flow includes one forwarding entry having a priority higher than the predefined minimum value. The forwarding entry having a priority higher than the predefined minimum value is generated by the SDN controller according to the primary forwarding path.

The flow unit 702 may receive the first flow. When determining that the locally stored forwarding entry for forwarding the first flow includes one forwarding entry having a priority higher than the predefined minimum value and detecting that a link connected to an egress port in the locally stored forwarding entry is failed, the flow unit 702 may set the priority of the locally stored forwarding entry as the predefined minimum value, and return the first flow to the key forwarding device to trigger the key forwarding device to forward the first flow according to the second forwarding entry.

In some examples of the present disclosure, the flow unit 702 may determine, in the locally stored forwarding entry for forwarding the first flow, an ingress port via which the first flow enters the routing device, and encapsulate the first flow with a special flow identity. The special flow identity is used for matching with a special flow entry, and the special flow entry is used for returning the first flow to the key forwarding device. The flow unit 702 may forward the first flow with the special flow identity via the ingress port to trigger the key forwarding device to forward the first flow according to the second forwarding entry.

In some examples of the present disclosure, the flow unit 702 may further receive a second flow with a special flow identity, and match the special flow identity of the second flow with a local special forwarding entry. The flow unit 702 may further perform, according to the local special forwarding entry, a process of:

removing the special flow identity of the second flow, searching for a locally stored forwarding entry having the highest priority and used for forwarding the second flow, setting the priority of the found forwarding entry having the highest priority and used for forwarding the second flow as the predefined minimum value, checking whether there is a locally stored forwarding entry having a priority higher than the predefined minimum value and used for forwarding the second flow; if there is a locally stored forwarding entry having a priority higher than the predefined minimum value and used for forwarding the second flow, forwarding the second flow according to the forwarding entry having a priority higher than the predefined minimum value and used for forwarding the second flow; if there is no locally stored forwarding entry having a priority higher than the predefined minimum value and used for forwarding the second flow, determining, in the found forwarding entry having the highest priority and used for forwarding the second flow, an ingress port via which the second flow enters the routing device, encapsulating the second flow with a special flow identity, and forwarding the second flow with the special flow identity via the ingress port.

In some examples of the present disclosure, when determining that the locally stored forwarding entry for forwarding the first flow includes the first forwarding entry and the second forwarding entry, the flow unit 702 may select the first forwarding entry with a priority higher than the priority of the second forwarding entry. When detecting that a link connected to an egress port in the first forwarding entry is failed, the flow unit 702 may set the priority of the first forwarding entry as the predefined minimum value, and forward the first flow according to the second forwarding entry.

In some examples of the present disclosure, when the routing device is located in a secondary forwarding path for forwarding a third flow but is not determined as a key forwarding device by the SDN controller, the entry unit 701 may receive a forwarding entry that is issued by the SDN controller and is used for forwarding the third flow, and store the forwarding entry for forwarding the third flow locally. The locally stored forwarding entry for forwarding the third flow includes one forwarding entry having a priority higher than the predefined minimum value, and the forwarding entry having the priority higher than the predefined minimum value is generated by the SDN controller according to the secondary forwarding path for forwarding the third flow. The flow unit 702 may receive the third flow forwarded by the key forwarding device. The third flow is forwarded by the key forwarding device according to one of two locally stored forwarding entries for forwarding the third flow after removing a special flow identity of the third flow, wherein the priority of the one of two locally stored forwarding entries is lower than the priority of the other one of two locally stored forwarding entries. When determining that the locally stored forwarding entry for forwarding the third flow includes one forwarding entry having a priority higher than the predefined minimum value, the flow unit 702 may forward the third flow according to the forwarding entry having the priority higher than the predefined minimum value.

Figure 8:
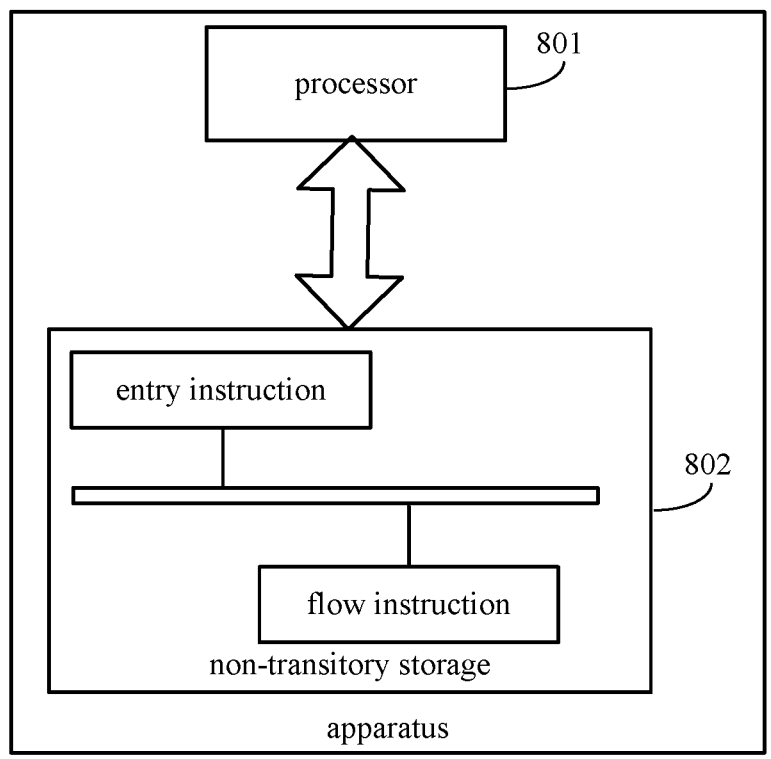
FIG. 8 is a diagram illustrating the hardware structure of a path switching apparatus according to some examples of the present disclosure.

The hardware structure of the path switching apparatus is provided according to some examples of the present disclosure. FIG. 8 is a diagram illustrating the hardware structure of a path switching apparatus according to some examples of the present disclosure. The apparatus is a routing device in the SDN.

As shown in FIG. 8, the apparatus includes a processor 801, for example, a CPU, and a non-transitory storage 802.

In some examples, the non-transitory storage 802 may store machine readable instructions that can be executed by the processor 801. The machine readable instructions include an entry instruction and a flow instruction.

In some examples, the processor 801 may read the entry instruction stored in the non-transitory storage 802 to perform a process of:

receiving a forwarding entry that is issued by an SDN controller and is used for forwarding a first flow, and storing the forwarding entry locally; wherein when the routing device is determined as a key forwarding device of the first flow by the SDN controller, the locally stored forwarding entry for forwarding the first flow includes a first forwarding entry and a second forwarding entry, the priority of the first forwarding entry is higher than that of the second forwarding entry and the priorities of the first forwarding entry and the second forwarding entry are larger than a predefined minimum value; the first forwarding entry is generated by the SDN controller according to a primary forwarding path determined for the first flow, and the second forwarding entry is generated by the SDN controller according to a secondary forwarding path determined for the first flow; when the routing device is located in the primary forwarding path but is not determined as the key forwarding device of the first flow by the SDN controller, the locally stored forwarding entry for forwarding the first flow includes one forwarding entry having a priority higher than the predefined minimum value;

In some examples, the processor 801 may read the flow instruction stored in the non-transitory storage 802 to perform a process of:

receiving the first flow; when determining that the locally stored forwarding entry for forwarding the first flow includes one forwarding entry having a priority higher than the predefined minimum value and detecting that a link connected to an egress port in the locally stored forwarding entry is failed, setting the priority of the locally stored forwarding entry as the predefined minimum value; and returning the first flow to the key forwarding device to trigger the key forwarding device to forward the first flow according to the second forwarding entry.

In some examples, the processor 801 may read the flow instruction stored in the non-transitory storage 802 to perform a process of:

determining, in the locally stored forwarding entry for forwarding the first flow, an ingress port via which the first flow enters the routing device;

encapsulating the first flow with a special flow identity, wherein the special flow identity is used for matching with a special flow entry, and the special flow entry is used for returning the first flow to the key forwarding device; and forwarding the first flow with the special flow identity via the ingress port.

In some examples, the processor 801 may read the flow instruction stored in the non-transitory storage 802 to perform a process of:

receiving a second flow with a special flow identity, and matching the special flow identity of the second flow with a local special forwarding entry;

performing, according to the local special forwarding entry, a process of: removing the special flow identity of the second flow, searching for a locally stored forwarding entry having the highest priority and used for forwarding the second flow, setting the priority of the found forwarding entry having the highest priority and used for forwarding the second flow as the predefined minimum value, checking whether there is a locally stored forwarding entry having a priority higher than the predefined minimum value and used for forwarding the second flow; if there is a locally stored forwarding entry having a priority higher than the predefined minimum value and used for forwarding the second flow, forwarding the second flow according to the forwarding entry having a priority higher than the predefined minimum value and used for forwarding the second flow; if there is no locally stored forwarding entry having a priority higher than the predefined minimum value and used for forwarding the second flow, determining, in the found forwarding entry having the highest priority and used for forwarding the second flow, an ingress port via which the second flow enters the routing device, encapsulating the second flow with a special flow identity, and forwarding the second flow with the special flow identity via the ingress port.

In some examples, the processor 801 may read the flow instruction stored in the non-transitory storage 802 to perform a process of:

when determining that the locally stored forwarding entry for forwarding the first flow includes the first forwarding entry and the second forwarding entry, selecting the first forwarding entry with a priority higher than the priority of the second forwarding entry; when detecting that a link connected to an egress port in the first forwarding entry is failed, setting the priority of the first forwarding entry as the predefined minimum value, and forwarding the first flow according to the second forwarding entry.

In some examples, the processor 801 may read the entry instruction stored in the non-transitory storage 802 to perform a process of:

when the routing device is located in a secondary forwarding path for forwarding a third flow but is not determined as a key forwarding device of the third flow by the SDN controller, receiving a forwarding entry that is issued by the SDN controller and is used for forwarding the third flow, and storing the forwarding entry for forwarding the third flow locally, wherein the locally stored forwarding entry for forwarding the third flow includes one forwarding entry having a priority higher than the predefined minimum value, and the forwarding entry having the priority higher than the predefined minimum value is generated by the SDN controller according to the secondary forwarding path for forwarding the third flow.

In some examples, the processor 801 may read the flow instruction stored in the non-transitory storage 802 to perform a process of:

receiving the third flow forwarded by the key forwarding device, wherein the third flow is forwarded by the key forwarding device according to one of two locally stored forwarding entries for forwarding the third flow after removing a special flow identity of the third flow, wherein the priority of the one of two locally stored forwarding entries is lower than the priority of the other one of two locally stored forwarding entries; and when determining that the locally stored forwarding entry for forwarding the third flow includes one forwarding entry having a priority higher than the predefined minimum value, forwarding the third flow according to the forwarding entry having the priority higher than the predefined minimum value.

Figure 9:
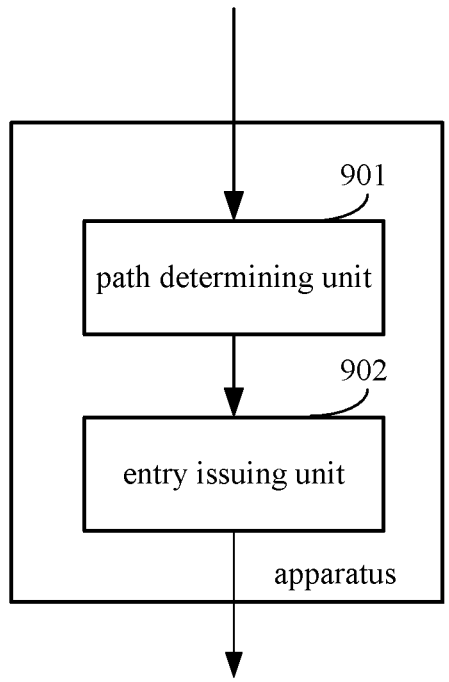
FIG. 9 is a diagram illustrating the structure of another path switching apparatus according to some examples of the present disclosure.

FIG. 9 is a diagram illustrating the structure of another path switching apparatus according to some examples of the present disclosure. The apparatus may be applicable to an SDN controller in an SDN. As shown in FIG. 9, the apparatus includes a path determining unit 901 and an entry issuing unit 902.

The path determining unit 901 may determine a primary forwarding path and a secondary forwarding path for a flow.

When a routing device is a key forwarding device of the flow, the entry issuing unit 902 may issue two forwarding entries for forwarding the flow. The priorities of the two forwarding entries are different but are both larger than a predefined minimum value. A forwarding entry having a higher priority is generated according to the primary forwarding path by the SDN controller, and a forwarding entry having a lower priority is generated according to the secondary forwarding path by the SDN controller. When the routing device is located at a branching point of the primary forwarding path and the secondary forwarding path, the routing device is determined as the key forwarding device of the flow.

When the routing device is located in the primary forwarding path but is not the key forwarding device of the flow, the entry issuing unit 902 may issue one forwarding entry having a priority higher than the predefined minimum value. The forwarding entry having a priority higher than the predefined minimum value is generated according to the primary forwarding path.

When the routing device is located in the secondary forwarding path but is not the key forwarding device of the flow, the entry issuing unit 902 may issue one forwarding entry having a priority higher than the predefined minimum value. The forwarding entry having a priority higher than the predefined minimum value is generated according to the secondary forwarding path.

Figure 10:
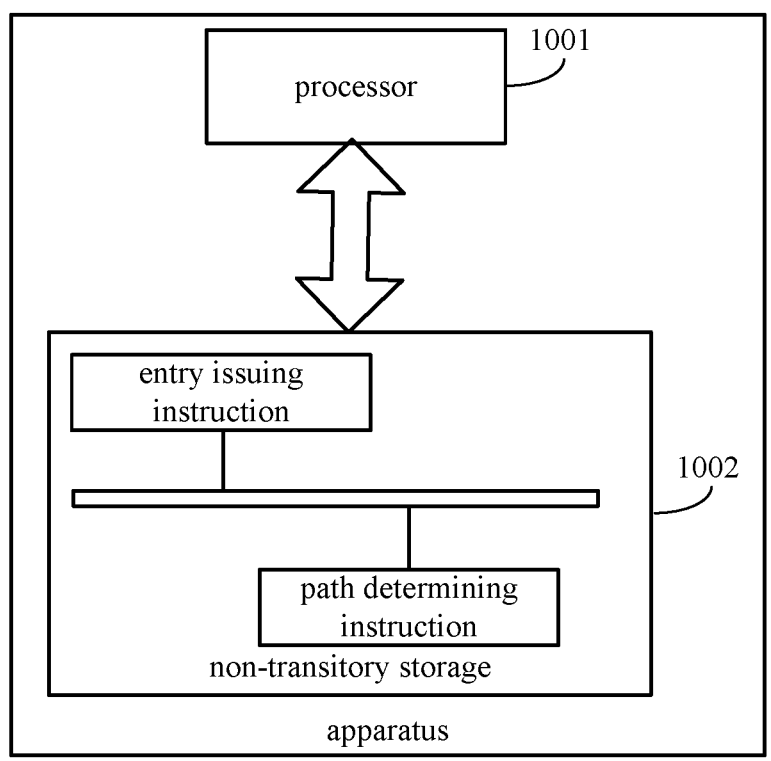
FIG. 10 is a diagram illustrating the hardware structure of another path switching apparatus according to some examples of the present disclosure.

The hardware structure of the path switching apparatus is provided according to some examples of the present disclosure. FIG. 10 is a diagram illustrating the hardware structure of another path switching apparatus according to some examples of the present disclosure. The apparatus is an SDN controller in an SDN.

As shown in FIG. 10, the apparatus includes a processor 1001, for example, a CPU, and a non-transitory storage 1002.

In some examples, the non-transitory storage 1002 may store machine readable instructions that can be executed by the processor 1001. The machine readable instructions include a path determining instruction and an entry issuing instruction.

In some examples, the processor 1001 may read the path determining instruction stored in the non-transitory storage 1002 to perform a process of:

determining a primary forwarding path and a secondary forwarding path for a flow.

In some examples, the processor 1001 may read the entry issuing instruction stored in the non-transitory storage 1002 to perform a process of:

when a routing device is a key forwarding device of the flow, issuing to the routing device two forwarding entries for forwarding the flow; wherein the priorities of the two forwarding entries are different but are larger than a predefined minimum value; a forwarding entry having a higher priority is generated according to the primary forwarding path by the SDN controller, and a forwarding entry having a lower priority is generated according to the secondary forwarding path by the SDN controller; when the routing device is located at a branching point of the primary forwarding path and the secondary forwarding path, the routing device is determined as the key forwarding device of the flow;

when the routing device is located in the primary forwarding path but is not the key forwarding device of the flow, issuing to the routing device one forwarding entry having a priority higher than the predefined minimum value, wherein the forwarding entry is generated according to the primary forwarding path; and when the routing device is located in the secondary forwarding path but is not the key forwarding device of the flow, issuing to the routing device one forwarding entry having a priority higher than the predefined minimum value, wherein the forwarding entry is generated according to the secondary forwarding path.

In some examples of the present disclosure, the routing device checks a link connected to an egress port in a locally stored forwarding entry having the highest priority and used for forwarding a flow. When detecting that the link is failed, the routing device sets the priority of the forwarding entry having the highest priority as a predefined minimum value. Further, if there is a locally stored forwarding entry having a priority higher than the predefined minimum value and used for forwarding the flow, the routing device forwards the flow via an egress port in the locally stored forwarding entry having a priority higher than the predefined minimum value and used for forwarding the flow. Otherwise, the routing device returns the flow to the key forwarding device of the flow. The key forwarding device sets the priority of a forwarding entry having the highest priority and used for forwarding the flow as the predefined minimum value, and forwards the flow according to a forwarding entry having a lower priority and used for forwarding the flow, thereby implementing rapid link convergence and avoiding the disconnection of the flow caused by the failure of the link.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

What is claimed is:

1. A path switching method, applicable to a routing device in a Software Defined Network (SDN) and comprising:

receiving a forwarding entry that is issued by an SDN controller and is used for forwarding a first flow, and storing the forwarding entry locally; wherein when the routing device is determined as a key forwarding device of the first flow by the SDN controller, the locally stored forwarding entry for forwarding the first flow comprises a first forwarding entry and a second forwarding entry; a priority of the first forwarding entry is higher than a priority of the second forwarding entry and the priorities of the first forwarding entry and the second forwarding entry are larger than a predefined minimum value; the first forwarding entry is generated by the SDN controller according to a primary forwarding path determined for the first flow, and the second forwarding entry is generated by the SDN controller according to a secondary forwarding path determined for the first flow; when the routing device is located in the primary forwarding path but is not determined as the key forwarding device of the first flow by the SDN controller, the locally stored forwarding entry for forwarding the first flow comprises one forwarding entry having a priority higher than the predefined minimum value; and receiving the first flow; when determining that the locally stored forwarding entry for forwarding the first flow comprises the one forwarding entry having the priority higher than the predefined minimum value and detecting that a link connected to an egress port in the locally stored forwarding entry has failed, setting the priority of the locally stored forwarding entry as the predefined minimum value; and returning the first flow to the key forwarding device to trigger the key forwarding device to forward the first flow according to the second forwarding entry, wherein returning the first flow to the key forwarding device comprises:
determining, in the locally stored forwarding entry for forwarding the first flow, an ingress port via which the first flow enters the routing device;
encapsulating the first flow with a special flow identity, wherein the special flow identity is used for matching with a special flow entry, and the special flow entry is used for returning the first flow to the key forwarding device, is issued by the SDN controller to the routing device in the primary forwarding path of the flow, wherein the special flow entry is only matched with the special flow identity; and
forwarding the first flow with the special flow identity via the ingress port.

2. The method of claim 1, further comprising:
receiving a second flow with a special flow identity, and matching the special flow identity of the second flow with a local special forwarding entry;
performing, according to the local special forwarding entry, a process of: removing the special flow identity of the second flow, searching for a locally stored forwarding entry having the highest priority and used for forwarding the second flow, setting the priority of the found forwarding entry having the highest priority and used for forwarding the second flow as the predefined minimum value, checking whether there is a locally stored forwarding entry having the priority higher than the predefined minimum value and used for forwarding the second flow; if there is a locally stored forwarding entry having the priority higher than the predefined minimum value and used for forwarding the second flow, forwarding the second flow according to the forwarding entry having the priority higher than the predefined minimum value and used for forwarding the second flow; if there is no locally stored forwarding entry having the priority higher than the predefined minimum value and used for forwarding the second flow, determining, in the found forwarding entry having the highest priority and used for forwarding the second flow, an ingress port via which the second flow enters the routing device, encapsulating the second flow with a special flow identity, and forwarding the second flow with the special flow identity via the ingress port.

3. The method of claim 1, wherein after receiving the first flow, the method further comprises:
when determining that the locally stored forwarding entry for forwarding the first flow comprises the first forwarding entry and the second forwarding entry, selecting the first forwarding entry with the priority higher than the priority of the second forwarding entry; when detecting that a link connected to an egress port in the first forwarding entry has failed, setting the priority of the first forwarding entry as the predefined minimum value, and forwarding the first flow according to the second forwarding entry.

4. The method of claim 1, further comprising:
when the routing device is located in a secondary forwarding path for forwarding a third flow but is not determined as a key forwarding device of the third flow by the SDN controller, receiving a forwarding entry that is issued by the SDN controller and is used for forwarding the third flow, and storing the forwarding entry for forwarding the third flow locally, wherein the locally stored forwarding entry for forwarding the third flow comprises one forwarding entry having the priority higher than the predefined minimum value, and the forwarding entry having the priority higher than the predefined minimum value is generated by the SDN controller according to the secondary forwarding path for forwarding the third flow;
receiving the third flow forwarded by the key forwarding device, wherein the third flow is forwarded by the key forwarding device according to one of two locally stored forwarding entries for forwarding the third flow after removing a special flow identity of the third flow, wherein the priority of the one of two locally stored forwarding entries is lower than the priority of the other one of two locally stored forwarding entries; and
when determining that the locally stored forwarding entry for forwarding the third flow comprises one forwarding entry having the priority higher than the predefined minimum value, forwarding the third flow according to the forwarding entry having the priority higher than the predefined minimum value.

5. The method of claim 1, further comprising:
receiving a second flow with a special flow identity, and matching the special flow identity of the second flow with a local special forwarding entry;
performing, according to the local special forwarding entry, a process of: removing the special flow identity of the second flow, searching for a locally stored forwarding entry having the highest priority and used for forwarding the second flow, setting the priority of the found forwarding entry having the highest priority and used for forwarding the second flow as the predefined minimum value, checking whether there is a locally stored forwarding entry having the priority higher than the predefined minimum value and used for forwarding the second flow; if there is a locally stored forwarding entry having the priority higher than the predefined minimum value and used for forwarding the second flow, forwarding the second flow according to the forwarding entry having the priority higher than the predefined minimum value and used for forwarding the second flow; if there is no locally stored forwarding entry having the priority higher than the predefined minimum value and used for forwarding the second flow, determining, in the found forwarding entry having the highest priority and used for forwarding the second flow, an ingress port via which the second flow enters the routing device, encapsulating the second flow with a special flow identity, and forwarding the second flow with the special flow identity via the ingress port.

6. A path switching method, applicable to a Software Defined Network (SDN) controller in an SDN and comprising:
determining a primary forwarding path and a secondary forwarding path for a flow;
when a routing device is a key forwarding device of the flow, issuing to the routing device two forwarding entries for forwarding the flow; wherein the priorities of the two forwarding entries are different but are larger than a predefined minimum value; a forwarding entry having a higher priority is generated according to the primary forwarding path by the SDN controller, and a forwarding entry having a lower priority is generated according to the secondary forwarding path by the SDN controller; when the routing device is located at a branching point of the primary forwarding path and the secondary forwarding path, the routing device is determined as the key forwarding device of the flow;
when the routing device is located in the primary forwarding path but is not the key forwarding device of the flow, issuing to the routing device one forwarding entry having a priority higher than the predefined minimum value, wherein the forwarding entry is generated according to the primary forwarding path; and when the routing device is located in the secondary forwarding path but is not the key forwarding device of the flow, issuing to the routing device one forwarding entry having the priority higher than the predefined minimum value, wherein the forwarding entry is generated according to the secondary forwarding path, wherein returning the first flow to the key forwarding device comprises:

determining, in the locally stored forwarding entry for forwarding the first flow, an ingress port via which the first flow enters the routing device;

encapsulating the first flow with a special flow identity, wherein the special flow identity is used for matching with a special flow entry, and the special flow entry is used for returning the first flow to the key forwarding device, is issued by the SDN controller to the routing device in the primary forwarding path of the flow, wherein the special flow entry is only matched with the special flow identity; and forwarding the first flow with the special flow identity via the ingress port.

7. A path switching apparatus, wherein the apparatus is a routing device in a Software Defined Network (SDN) and comprises a non-transitory storage and a processor;

the non-transitory storage is to store machine readable instructions that can be executed by the processor, wherein the machine readable instructions include an entry instruction and a flow instruction;

the processor is to read the entry instruction stored in the non-transitory storage to perform a process of:

receiving a forwarding entry that is issued by an SDN controller and is used for forwarding a first flow, and storing the forwarding entry locally; wherein when the routing device is determined as a key forwarding device of the first flow by the SDN controller, the locally stored forwarding entry for forwarding the first flow comprises a first forwarding entry and a second forwarding entry; a priority of the first forwarding entry is higher than a priority of the second forwarding entry and the priorities of the first forwarding entry and the second forwarding entry are larger than a predefined minimum value; the first forwarding entry is generated by the SDN controller according to a primary forwarding path determined for the first flow, and the second forwarding entry is generated by the SDN controller according to a secondary forwarding path determined for the first flow; when the routing device is located in the primary forwarding path but is not determined as the key forwarding device of the first flow by the SDN controller, the locally stored forwarding entry for forwarding the first flow comprises one forwarding entry having a priority higher than the predefined minimum value;

the processor is to read the flow instruction stored in the non-transitory storage to perform a process of:

receiving the first flow; when determining that the locally stored forwarding entry for forwarding the first flow comprises the one forwarding entry having the priority higher than the predefined minimum value and detecting that a link connected to an egress port in the locally stored forwarding entry has failed, setting the priority of the locally stored forwarding entry as the predefined minimum value; and returning the first flow to the key forwarding device to trigger the key forwarding device to forward the first flow according to the second forwarding entry, wherein the processor is to read the flow instruction stored in the non-transitory storage to perform a process of:

determining, in the locally stored forwarding entry for forwarding the first flow, an ingress port via which the first flow enters the routing device;

encapsulating the first flow with a special flow identity, wherein the special flow identity is used for matching with a special flow entry, and the special flow entry is used for returning the first flow to the key forwarding device, is issued by the SDN controller to the routing device in the primary forwarding path of the flow, wherein the special flow entry is only matched with the special flow identity; and forwarding the first flow with the special flow identity via the ingress port.

8. The apparatus of claim 7, wherein the processor is to read the flow instruction stored in the non-transitory storage to perform a process of:

receiving a second flow with a special flow identity, and matching the special flow identity of the second flow with a local special forwarding entry;

performing, according to the local special forwarding entry, a process of: removing the special flow identity of the second flow, searching for a locally stored forwarding entry having the highest priority and used for forwarding the second flow, setting the priority of the found forwarding entry having the highest priority and used for forwarding the second flow as the predefined minimum value, checking whether there is a locally stored forwarding entry having the priority higher than the predefined minimum value and used for forwarding the second flow; if there is a locally stored forwarding entry having the priority higher than the predefined minimum value and used for forwarding the second flow, forwarding the second flow according to the forwarding entry having the priority higher than the predefined minimum value and used for forwarding the second flow; if there is no locally stored forwarding entry having the priority higher than the predefined minimum value and used for forwarding the second flow, determining, in the found forwarding entry having the highest priority and used for forwarding the second flow, an ingress port via which the second flow enters the routing device, encapsulating the second flow with a special flow identity, and forwarding the second flow with the special flow identity via the ingress port.

9. The apparatus of claim 7, wherein the processor is to read the flow instruction stored in the non-transitory storage to perform a process of:

when determining that the locally stored forwarding entry for forwarding the first flow comprises the first forwarding entry and the second forwarding entry, selecting the first forwarding entry with the priority higher than the priority of the second forwarding entry; when detecting that a link connected to an egress port in the first forwarding entry has failed, setting the priority of the first forwarding entry as the predefined minimum value, and forwarding the first flow according to the second forwarding entry.

10. The apparatus of claim 7, wherein the processor is to read the entry instruction stored in the non-transitory storage to perform a process of:

when the routing device is located in a secondary forwarding path for forwarding a third flow but is not determined as a key forwarding device of the third flow by the SDN controller, receiving a forwarding entry that is issued by the SDN controller and is used for forwarding the third flow, and storing the forwarding entry for forwarding the third flow locally, wherein the locally stored forwarding entry for forwarding the third flow comprises one forwarding entry having the priority higher than the predefined minimum value, and the forwarding entry having the priority higher than the predefined minimum value is generated by the SDN controller according to the secondary forwarding path for forwarding the third flow;

the processor is to read the flow instruction stored in the non-transitory storage to perform a process of:

receiving the third flow forwarded by the key forwarding device, wherein the third flow is forwarded by the key forwarding device according to one of two locally stored forwarding entries for forwarding the third flow after removing a special flow identity of the third flow, wherein the priority of the one of two locally stored forwarding entries is lower than the priority of the other one of two locally stored forwarding entries; and when determining that the locally stored forwarding entry for forwarding the third flow comprises one forwarding entry having the priority higher than the predefined minimum value, forwarding the third flow according to the forwarding entry having the priority higher than the predefined minimum value.

11. The apparatus of claim 7, wherein the processor is to read the flow instruction stored in the non-transitory storage to perform a process of:

receiving a second flow with a special flow identity, and matching the special flow identity of the second flow with a local special forwarding entry;

performing, according to the local special forwarding entry, a process of: removing the special flow identity of the second flow, searching for a locally stored forwarding entry having the highest priority and used for forwarding the second flow, setting the priority of the found forwarding entry having the highest priority and used for forwarding the second flow as the predefined minimum value, checking whether there is a locally stored forwarding entry having the priority higher than the predefined minimum value and used for forwarding the second flow; if there is a locally stored forwarding entry having the priority higher than the predefined minimum value and used for forwarding the second flow, forwarding the second flow according to the forwarding entry having the priority higher than the predefined minimum value and used for forwarding the second flow; if there is no locally stored forwarding entry having the priority higher than the predefined minimum value and used for forwarding the second flow, determining, in the found forwarding entry having the highest priority and used for forwarding the second flow, an ingress port via which the second flow enters the routing device, encapsulating the second flow with a special flow identity, and forwarding the second flow with the special flow identity via the ingress port.

* * * * *